Aug. 20, 1929.   E. WILDHABER   1,725,037

METHOD OF FORMING TAPERED GEARS

Filed April 5, 1927

INVENTOR

Ernest Wildhaber

Patented Aug. 20, 1929.

1,725,037

UNITED STATES PATENT OFFICE.

ERNEST WILDHABER, OF BROOKLYN, NEW YORK, ASSIGNOR TO GLEASON WORKS, OF ROCHESTER, NEW YORK, A CORPORATION OF NEW YORK.

METHOD OF FORMING TAPERED GEARS.

Application filed April 5, 1927. Serial No. 181,159.

The present invention relates to methods of forming tapered gears, and especially to cutting and grinding spiral bevel gears and hypoid gears.

The invention will be particularly explained as carried out with the Gleason generator, which uses a tool of the form of a face mill. In the Gleason generators referred to, a cutting tool is journalled on a cradle, which cradle may perform a turning motion or rocking motion on its axis. Tooth surfaces of gears are formed by rotating a cutting tool adjacent a gear blank, by feeding said tool about the axis of said cradle, and by simultaneously turning the blank on its axis in timed relation to the motion of the cradle.

In one design of Gleason generator, which will be referred to as the standard design, the tool spindle is arranged parallel to the axis of the cradle; in another design, which may be called the universal design, the tool spindle is so adjustable on the cradle that any angularity between tool spindle and axis of the cradle may be effected.

One main object of the present invention is to provide a method for cutting or grinding both members of a pair of spiral bevel gears or of a pair of hypoid gears with a generator having the tool spindle arranged parallel to the cradle axis, the generation being effected in such manner that all the aims can be realized, which hitherto could be obtained only with the universal generator.

Such aims are especially: the use of few different tools, the provision of what is known as a bias correction, and the generation of tooth profiles which completely match each other, or which contain any desired and predetermined amount of mismatch.

A further object is to provide a method for forming a pair of fully corrected tapered gears, such as spiral bevel gears and hypoid gears, while using a generator having the cutter spindle arranged parallel to the cradle axis, and possessing means for offsetting blank axis and cradle axis, instead of using a universal generator which possesses in addition to the last named means also means for inclining the cutter spindle with respect to the cradle axis.

Another important object is to provide a method for cutting and grinding spiral bevel gears on generators having the tool spindle arranged parallel to the axis of the cradle, with a tool of constant pressure angle correction, as will be more fully described hereafter.

Other objects will be apparent in the course of the specification and from recital of the appended claims.

My novel method is illustrated by way of examples in the accompanying drawings, in which Fig. 1 is a plan view, partly a section, of a cutting tool in engagement with a gear blank, illustrative of a preferred way of cutting one member of a pair of tapered gears.

Figure 1:
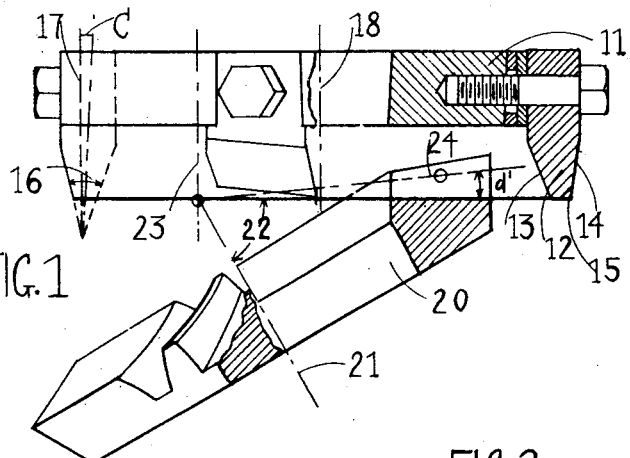
Figure 4:
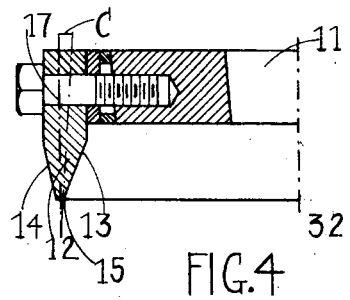
Fig. 4 is an axial section of the cutting tool shown in the Figures 2 and 3.
Figure 2:
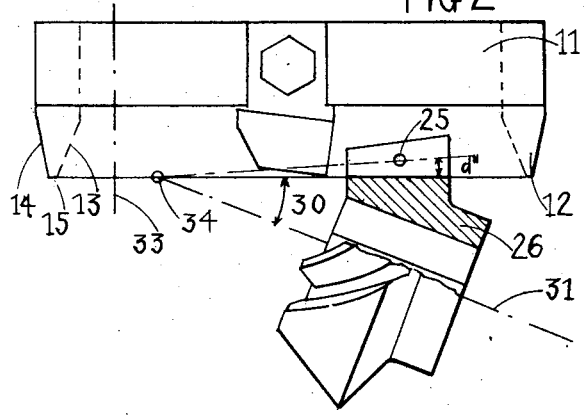
Fig. 2 is a plan view, partly a section, of a cutting tool in engagement with another gear blank, which is intended to mesh with the gear shown in Fig. 1.

In the Figures 1–4, 11 denotes a cutting tool of known type, of the form of a face mill, having cutting blades 12 arranged adjacent its periphery. While I have shown only a few of the blades, it is understood, that preferably blades are provided all around the periphery at distances as close as practically possible.

The tool contains a cutting profile which, in the illustrated case, consists of an inwardly disposed straight line 13, and of an outwardly disposed straight line 14, the two lines 13 and 14 being connected by a straight line 15 constituting the top of the blades. The lines 13 and 14 are understood to be the profile which the tool cuts. They are not necessarily identical with the cutting edges of the blades. They are identical with the cutting edges only in the case, where these are contained in axial planes, as well known.

Usually angle 16, included by the two cutting profiles 13 and 14, equals twice the pressure angle of the gears to be produced, as in present practice. The inclination of the individual cutting profiles 13, 14 towards a line 17 drawn parallel to cutter axis 18 differs from the said pressure angle by an amount C, called pressure angle correction, which according to the present invention may be any predetermined fixed amount.

In the methods hitherto used for cutting spiral bevel gears on generators having the cutter spindle arranged parallel to the cradle axis, the amount C is in a certain interrelation with the gears to be cut. If $d'$ and $d''$ represent the dedendum angles of a pair of spiral bevel gears, and $h$ represents the spiral angle at the center of the face, then, according to present practice the cutter or cutters to be used should contain a pressure angle correction C as follows:

$$C = \tfrac{1}{2}(d' + d'') \sin h$$

as known.

Hence for covering the whole gear field, a great number of cutters are required, having varying amounts of pressure angle correction C.

According to the present invention the pressure angle correction C of the cutters does not need to equal the above amount, but may be made any constant amount, so that cutters of equal pressure angle correction may be used to cover the whole gear field, or a great part of it.

Preferably a constant pressure angle correction C is selected which is larger than would correspond according to the above to most gear pairs intended to be covered.

Except for the cutter, the gear or larger member of the pair is preferably cut in the same manner as usual. Gear blank 20 is rotatably mounted on its axis 21, and set to its root angle 22, so that the angle included between axis 23 of the cradle and axis 21 of the blank equals (90°—angle 22). Both sides of a tooth space may be simultaneously generated as known for the standard process. To generate a tooth space, the cutter is rotated on its axis 18 and in addition the cradle is turned on its axis 23 while the blank is turned on its axis 21 in timed relation to the motion of the cradle. Blank and cradle then roll together like a gear on a crown gear, in the same manner as hitherto practiced, the axes 18 and 23 being parallel.

From the above said generation of the gear, the pressure angle and the spiral angle at a mean point 24 of the tooth surface can be determined with the known methods of computing. The pressure angle and the spiral angle at the corresponding point 25 of the mating pinion 26 should be equal to the above said angles, as known. Hence the location of the tooth normal at point 25 can be determined with respect to pinion 26. For convenience in computing, the points 24 and 25 are preferably selected on the pitch surfaces of the respective gears.

For generation pinion 26 is also set to its root angle (30). It is rotatably mounted on axis 31. The pinion cutter preferably contains the same constant pressure angle correction C as the gear cutter. It is mounted on a cradle of known shape and is rotatable on its axis 32, which is arranged parallel to the axis 33 of said cradle. Axis 33 preferably does not pass through the apex 34 of the blank, and may oftentimes be offset from axis 31 of the blank, as will be explained hereafter.

Point 24 of the gear meshes with the cutting surface of the tool in the position when passing the contact line between the pitch surfaces of the blank and of the basic crown gear represented by the tool. If point 25 of the pinion would mesh in the same manner with the cutting surface of the tool, namely when passing the projected axis of the blank (Fig. 3), then the above described equation for C would have to be observed, and the cutting method would be identical with the known standard cutting method, at least if the blank is so positioned that its apex lies in the axis of the cradle.

According to the present invention, point 25 is swung about the axis of the blank into a position as shown, until the inclination of the known tooth normal at point 25 equals the given inclination of the cutting profile (13 or 14) of the tool, which has a constant pressure angle correction C. After having located point 25 in its position of mesh with the cutting surface of the tool, the ratio of roll between blank and cradle is now so determined, that mesh at this position 25 can actually take place. This is the case, if the ratio provided equals the ratio of the moments, which are exerted upon the blank and upon the cradle by a force extending in the direction of the tooth normal at point 25.

The teeth of the pinion are frequently formed one side at a time; and it is with reference to cutting one side at a time, that my method will be explained with further detail.

Figure 5:
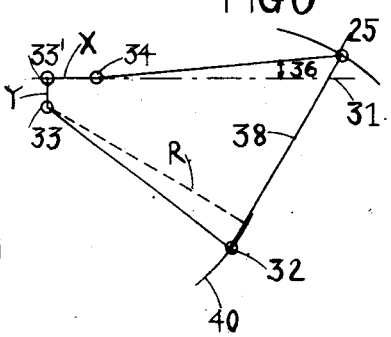
Fig. 5 is a diagram corresponding to Fig. 3 and containing geometric lines only.

Reference is made to the diagram Fig. 5, in which 34 denotes the apex of the blank and 33 the axis of the cradle. Axis 33 is offset from apex 34 by an amount X in the direction of the projected pinion axis 31, and may be offset by an amount Y in a direction at right angles to said projected axis.

Preferably the steps in computing are taken in the following order: First, the actual pressure angle and spiral angle of a tooth side of the gear, at point 24, is determined from the position of the cutter. Then the angle 36 (Fig. 5) is computed, by which line 25—34 is turned away from the projected pinion axis 31. Given are herein the inclinations of the tooth normal at point 25 with respect to the pitch surface of the pinion, and the inclination angle of said tooth normal at position 25 with respect to the plane of the drawing. The latter angle equals the given pressure angle of the tool. Then the projection 38 of the tooth normal, with respect to the plane of the drawing, is determined.

The axis of the cradle, that is to say the axis of the generating gear may now be assumed at any suitable position 33, or at a position 33' on the projected pinion axis, or in such manner as to pass through the apex 34 of the blank, depending on the purpose aimed at, as will be further explained hereafter.

After having determined the location of the cradle axis with respect to the blank, the ratio between blank and cradle is computed in such manner as to equal the ratio of the moments, which are exerted upon basic gear and pinion by a force acting in the direction of the tooth normal at point 25. The moment exerted upon the basic gear equals $$F. R. \cos a';$$

where F is the force acting in the direction of said tooth normal, R is the normal distance of axis 33 from said normal (see Fig. 5), and $a'$ is the inclination of the normal to the plane of the drawing, or also the profile angle of the tool.

The moment exerted upon the pinion equals $$F. A. \sin p. \cos a. \cos h;$$

where A denotes distance 25—34, $p$ is the pitch angle of the pinion, and $a$ and $h$ are the pressure angle and the spiral angle respectively at point 25.

The ratio between cradle and blank is therefore equal to $$\frac{R. \cos a'}{A. \sin p. \cos a. \cos h.}$$

In assuming the location 33 of the cradle axis with respect to the blank such purposes as the following may be aimed at:

1. Full profile bearing of the teeth is desired in addition to bias correction; or
2. Bias correction only is aimed at; or
3. Bias correction is not aimed at, but it is desired to generate both sides of the teeth with the same ratio of roll between blank and cradle, while using a cutter of constant pressure angle correction.

Purpose (1) can be completely attained only with the use of a generator, which permits to offset the blank axis and the cradle axis from one another. When such a generator is at hand, purpose (1) is preferably aimed at, and the pinion is then generated by turning a tool on an axis parallel to the cradle axis and by providing feeding motion between tool and blank about the axis of the blank and about the axis of the cradle, which is offset from the axis of the blank.

Figure 3:
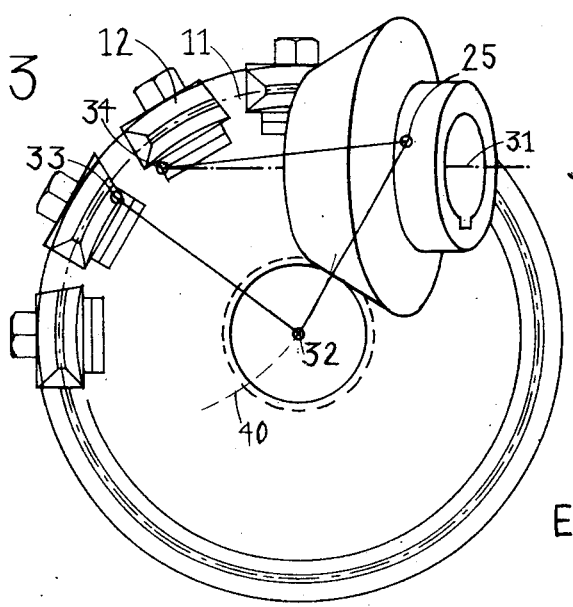
Fig. 3 is a front elevational view corresponding to Fig. 2.

This case, as applied to spiral bevel gears, has been illustrated in Fig. 3 and Fig. 5, where the path of the tool axis 32 is indicated as a circular arc 40, centered at 33.

Figure 6:
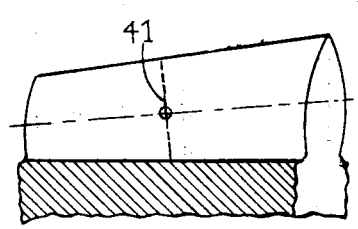
Fig. 6 is a view of a tooth surface, taken at right angles to the direction of the tooth.

The location of axis 33 may be computed with the known means of geometry and kinematics. Axis 33 is so placed, that mesh between gear and pinion can actually take place along the normal profiles (shown in dotted lines 41 in Fig. 6) while true uniform motion is transmitted. It is found that bias bearing, which extends obliquely across the face of the teeth, can thus be eliminated.

The aims (2) and (3) may be obtained with a standard generator.

It is understood that my invention is not limited to the example just described, which has been chosen concrete and definite for the purpose of clearer explanation.

The invention can be practiced not merely with face mill tools, but also with grinding wheels and with reciprocating tools: tools moving in a straight line and especially tools oscillating about an axis. The term of rotating used in the annexed claims is meant to cover both continuous rotation and repeated partial rotation.

Moreover while in the Gleason generator particularly referred to the blank is indexed after completion of a tooth surface or a pair of tooth surfaces, the method is likewise applicable when the blank is continuously indexed. In the case of a continuously rotating tool this process then might be called a hobbing process. Here also planing tools may be used.

Neither is the method confined to spiral bevel gears, but is broadly applicable to tapered gears, especially also to hypoid gears.

Any such changes or modifications may be made in my invention without departing from its spirit, as customary or known practice in the art of forming gears.

For defining the scope of my invention I rely upon the annexed claims.

What I claim is:

1. The method of forming a tapered gear with a cutter having a constant correction angle which is independent of the spiral and dedendum angles being cut which consists in engaging the tool and blank with the tip surface of the tool and root surface of the blank tangent to a common plane, in imparting a cutting movement to the tool while simultaneously producing a relative rolling motion between the tool and blank comprising rotation of the blank on its axis and a relative rotational movement between the tool and blank about an axis perpendicular to the common tangent plane, the character of said rolling motion being determined by the relation of the tool correction angle to the spiral and dedendum angles of the gear to be cut.

2. The method of producing a tapered gear with a cutter having a constant correction angle which is independent of the spiral and dedendum angles being cut which consists in engaging the tool and blank with the tip surface of the tool and root surface of the blank tangent to a common plane, in imparting a cutting movement to the tool and blank while simultaneously producing a relative rolling motion between the tool and blank comprising rotation of the blank on its axis and a relative rotational movement between the tool and blank about an axis perpendicular to the common tangent plane, the ratio of said rotational movements being determined by the relation of the tool correction angle to the spiral and dedendum angles of the gears to be cut.

3. The method of producing a spiral bevel gear with a cutter having a constant correction angle which is independent of the spiral and dedendum angles being cut which consists in rotating the tool in engagement with the gear blank and simultaneously producing a relative rolling motion between the tool and blank about an axis parallel to the tool axis, the character of said rolling motion being determined by the relation of the tool correction angle to the spiral and dedendum angles of the gear to be cut.

4. The method of producing a spiral bevel gear with a cutter having a constant correction angle which is independent of the spiral and dedendum angles being cut which consists in rotating the tool in engagement with the gear blank and simultaneously producing a relative rolling motion between the tool and blank comprising rotation of the blank on its axis and a relative rotational movement between the tool and blank about an axis parallel to the tool axis, the ratios of said rotational movements being determined by the relation of the tool correction angle to the spiral and dedendum angles of the gear to be cut.

5. The method of producing a tapered gear which consists in employing a tool having a constant correction angle which is independent of the spiral and dedendum angles being cut and in engaging the tool and blank with the tip surface of the tool and the root surface of the blank tangent to a common plane and imparting a cutting movement to the tool in engagement with the gear blank while simultaneously producing a relative rolling motion between the tool and blank comprising rotation of the blank on its axis and a relative rotational movement between the tool and blank about an axis perpendicular to the common tangent plane and offset from the apex of the blank.

6. The method of producing a tapered gear which consists in employing a tool having a constant correction angle which is independent of the spiral and dedendum angles being cut and in engaging the tool and blank with the tip surface of the tool and the root surface of the blank tangent to a common plane and imparting a cutting movement to the tool in engagement with the blank while simultaneously producing a relative rolling motion between the tool and blank comprising rotation of the blank on its axis and a relative rotational movement between the tool and blank about an axis perpendicular to the common tangent plane and offset from the axis of the blank.

7. The method of producing a spiral bevel gear which consists in employing a tool having a constant correction angle which is independent of the spiral and dedendum angles being cut and moving the tool in a curved path across the face of a gear blank while simultaneously producing a relative rolling motion between the tool and blank comprising rotation of the blank on its axis and a relative rotational movement between the tool and blank about an axis parallel to the axis about which the tool moves and offset from the apex of the blank.

8. The method of producing a spiral bevel gear which consists in employing a tool having a constant correction angle which is independent of the spiral and dedendum angles being cut and moving the tool in a curved path across the face of a gear blank while simultaneously producing a relative rolling motion between the tool and blank comprising rotation of the blank on its axis and a relative rotational movement between the tool and blank about an axis parallel to the axis about which the tool moves and offset from the axis of the blank.

9. The method of producing a pair of tapered gears which consists in generating one member of the pair by positioning a gear blank and a tool having a constant correction angle which is independent of the spiral and dedenum angles of the pair being cut with the root surface of the blank and the tip surface of the tool tangent to a common plane and imparting a cutting movement to the tool while producing a relative rolling movement between the tool and blank comprising rotation of the blank on its axis and a relative rotational movement between the tool and blank about an axis perpendicular to the common tangent plane and in generating the other member of the pair by positioning a gear blank and a tool having the same correction angle as the tool employed to cut the first member with the root surface of the blank and the tip surface of the tool tangent to a common plane and imparting a cutting movement to the tool while producing a relative rolling movement between the tool and blank comprising also a rotation of the blank on its axis and a relative rotational movement between the tool and blank about an axis perpendicular to the common tangent plane.

10. The method of producing a pair of spiral bevel gears which consists in generating one member of the pair by rotating a tool having a constant correction angle which is independent of the spiral and dedendum angles of the pair being cut in engagement with a gear blank while simultaneously producing a relative rolling motion between the tool and blank comprising a rotary motion about the axis of the blank and a rotary motion about an axis parallel to the axis of the tool and in generating the other member of the pair by rotating a tool having the same correction angle as the tool used to cut the first member in engagement with a gear blank while simultaneously producing a relative rolling motion between the second tool and blank comprising, also, rotation of the blank on its axis and a relative rotational movement between the tool and blank about an axis parallel to the axis of the tool.

11. The method of producing a pair of tapered gears which consists in generating one member of the pair by positioning a gear blank and a tool having a constant correction angle which is independent of the spiral and dedendum angles of the pair being cut in engagement with the root surface of the blank and the tip surface of the tool tangent to a common plane and imparting a cutting movement to the tool while producing a relative rolling motion between the tool and blank comprising rotation of the blank on its axis and a relative rotational movement between the tool and blank about an axis perpendicular to the common tangent plane and passing through the apex of the blank and in generating the other member of the pair with a tool having the same correction angle as the first tool and positioned so that its tip surface and the root surface of the blank are tangent to a common plane by imparting a cutting movement to the tool while producing a relative rolling motion between the second tool and blank comprising rotation of the second blank on its axis and a relative rotational movement between the second tool and blank about an axis perpendicular to the common tangent plane and offset from the apex of the blank.

12. The method of producing a pair of tapered gears which consists in generating one member of the pair by positioning a gear blank and a tool having a constant correction angle which is independent of the spiral and dedendum angles of the pair being cut with the root surface of the blank and the tip surface of the tool tangent to a common plane and imparting a cutting movement to the tool while producing a relative rolling movement between the tool and blank comprising rotation of the blank on its axis and a relative rotational movement between the tool and blank about an axis perpendicular to the common tangent plane and passing through the apex of the blank and in generating the other member of the pair with a tool having the same correction angle as the first tool and positioned so that its tip surface and the root surface of the blank are tangent to a common plane by imparting a cutting movement to the second tool while producing a relative rolling motion between the second tool and blank comprising rotation of the second blank on its axis and an additional relative rotational movement between the second tool and blank about an axis perpendicular to the common tangent plane and offset from the axis of the second blank.

13. The method of producing a pair of spiral bevel gears which consists in generating one member of the pair by rotating a tool having a constant correction angle which is independent of the spiral and dedendum angles of the pair being cut in engagement with a tapered gear blank while producing a relative rolling movement between the tool and blank comprising rotation of the blank on its axis and an additional relative rotational movement between the tool and blank about an axis parallel to the axis of the tool and passing through the apex of the blank and in generating the other member of the pair with a tool having a correction angle the same as the first tool by rotating the second tool in engagement with a gear blank while simultaneously producing a relative rolling movement between the second tool and blank comprising rotation of the second blank on its axis and an additional rotational movement between the second tool and blank about an axis parallel to the axis of the tool and offset from the axis of the second blank.

14. The method of producing a pair of spiral bevel gears which consists in generating one member of the pair by rotating a tool having a constant correction angle which is independent of the spiral and dedendum angle of the pair being cut in engagement with a tapered gear blank while producing a relative rolling motion between the tool and blank comprising rotation of the blank on its axis and a relative rotational movement between the tool and blank about an axis parallel to the axis of the tool and passing through the apex of the blank and in generating the other member of the pair with a tool having the same correction angle as the first tool by rotating the second tool in engagement with a tapered gear blank while rotating the blank on its axis and simultaneously producing a relative rolling movement between the second tool and blank comprising rotation of the blank on its axis and additional relative rotational movement between the second tool and blank about an axis parallel to the axis of the second tool and offset from the apex of the second blank.

ERNEST WILDHABER.